United States Patent [19]
Albertson et al.

[11] Patent Number: 5,729,991
[45] Date of Patent: Mar. 24, 1998

[54] PRESSURE RELIEF SYSTEM FOR A REFRIGERATION SYSTEM

[76] Inventors: Luther D. Albertson, 3934 Carver St., New Albany, Ind. 47150; Walter R. Key, 6362 Minlo Dr., Indianapolis, Ind. 46227; Mark B. Key, 6434 Harting Overlook, Indianapolis, Ind. 46237

[21] Appl. No.: 654,619

[22] Filed: May 29, 1996

[51] Int. Cl.$^6$ .................................................. F25B 45/00
[52] U.S. Cl. .............................. 62/149; 62/174; 137/523
[58] Field of Search ................... 62/174, 149; 137/587, 137/522, 523

[56] References Cited

U.S. PATENT DOCUMENTS

| | | |
|---|---|---|
| 3,563,267 | 2/1971 | Thompson . |
| 4,190,075 | 2/1980 | Kayser . |
| 4,745,948 | 5/1988 | Wilcox et al. . |
| 4,967,791 | 11/1990 | Sternberger . |
| 4,971,107 | 11/1990 | Yonezawa . |
| 5,141,012 | 8/1992 | Gavrilla . |
| 5,259,204 | 11/1993 | McKeown . |
| 5,335,511 | 8/1994 | McKeown ............................ 62/174 |
| 5,359,863 | 11/1994 | Lewis . |
| 5,379,604 | 1/1995 | Furr . |
| 5,542,261 | 8/1996 | Albertson . |

*Primary Examiner*—John M. Sollecito
*Attorney, Agent, or Firm*—Woodard Emhardt Naughton Moriarty & McNett

[57] ABSTRACT

A pressure relief system for a mechanical refrigeration system. In one embodiment the pressure relief system having a pair of pressure relief valves connected in series to a pressure vessel that contains refrigerant. The pressure relief system allowing the changing of the primary pressure relief valve while the vessel is pressurized without the loss of overpressure protection.

26 Claims, 6 Drawing Sheets

PRESSURE RELIEF SYSTEM FOR A REFRIGERATION SYSTEM

BACKGROUND OF THE INVENTION

The present invention relates generally to the field of pressure relief systems for mechanical refrigeration systems, and more particularly to a pressure relief system that allows the removal of one pressure relief unit from a pressurized vessel without the loss of refrigerant or vessel protection. Although the invention was developed for mechanical refrigeration systems, certain applications may be outside of this field.

Refrigeration systems are utilized in many commercial and industrial applications, such as to provide air conditioning in hotels, the cooling of heat transfer medium in a manufacturing process, and commercial food refrigeration systems. Inherent with each of the above refrigeration systems is a customer expectation of minimal equipment downtime. Any downtime associated with the mechanical refrigeration system is at best an inconvenience for the customer, and often can have very costly consequences, such as food spoilage in commercial food refrigeration systems.

Mechanical refrigeration systems generally utilize a chlorinated fluorocarbon (CFC) refrigerant. CFC refrigerants, many of which are sold by DuPont under the well known trade name FREON have various boiling points depending on the particular type of CFC refrigerant. FREON and its related family of compounds are well known and widely used as heat transfer media in mechanical refrigeration systems wherein the transfer of heat involves manipulating the compounds to various temperature and pressure states. Any significant misuse and/or malfunction of the refrigerant system can cause excessive internal pressure and without prompt corrective action may lead to damage of the equipment and/or injury to personnel.

It is known that refrigeration systems generally include the pressurized storage of a vaporized refrigerant. In an effort to comply with applicable state and/or local codes and regulations most refrigeration systems include a pressure relief system for protecting the pressure vessel from over-pressurization. For many years there was minimal industry recognition of problems associated with venting CFC refrigerants from the pressure vessel into the environment. Recently, because of the concern for the environment and the possible destruction of the ozone layer above the earth, it has become desirable, and in many cases mandated that the release of CFC refrigerant into the environment be minimized.

Environmental concerns, though significant, are not the only factor in favor of minimizing the release of CFC refrigerant into the environment. In recent years the price of many CFC refrigerants have escalated drastically, for example the price of some refrigerants have increased over ten fold, while the available supply is dwindling. Thus, for economic and environment reasons it is desirable to minimize the discharge of refrigerant into the environment.

Figure 1:
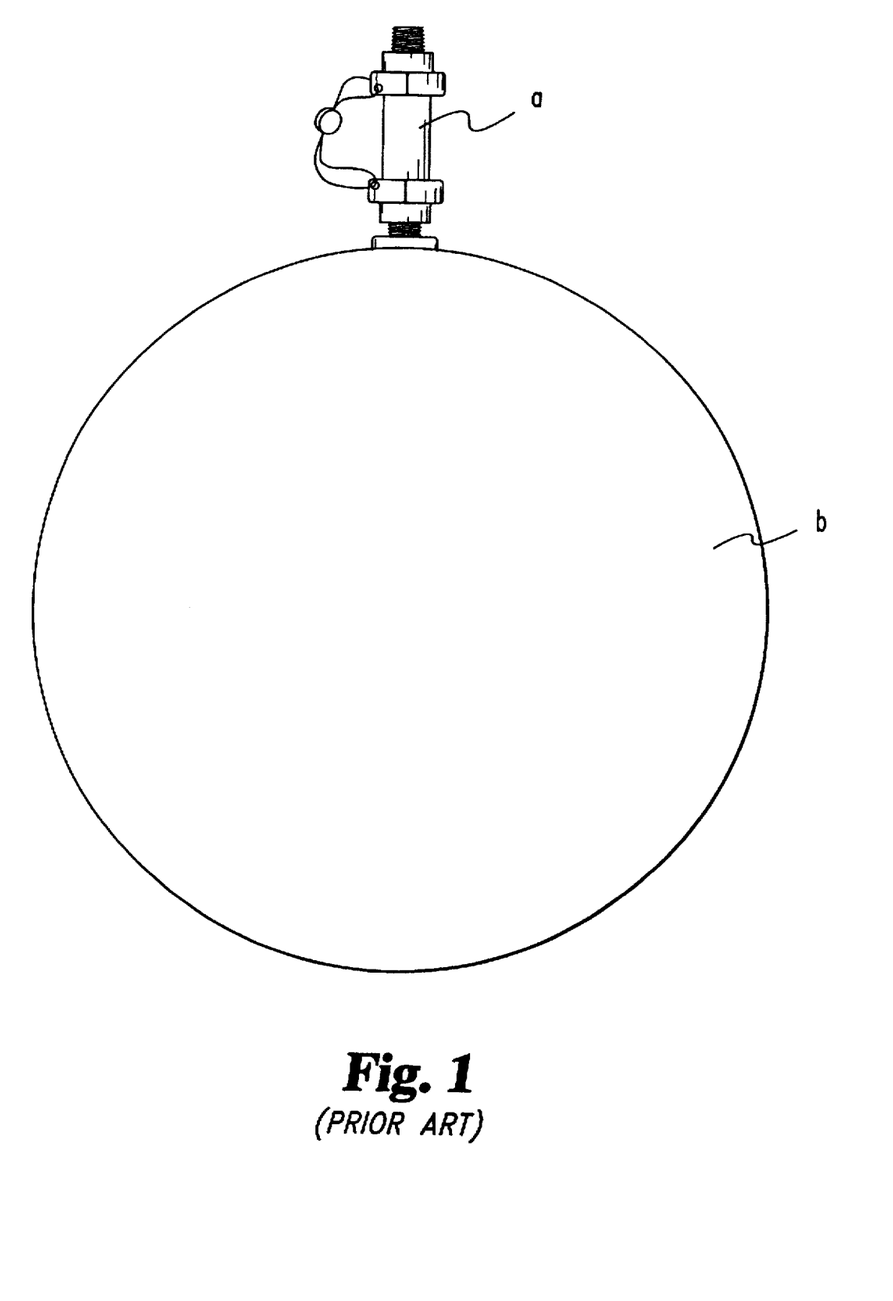
FIG. 1 is an illustrative view of a prior art pressure relief valve connected to a pressure vessel.

In the design of pressure relief systems for mechanical refrigeration systems it has become an industry practice to utilize a mechanical pressure relief reseating type valve. Typically, mechanical reseating type valves have been connected to a pressure vessel or fluid pathway which is connected to the pressure vessel. With reference to FIG. 1, there is illustrated a prior art mechanical reseating type valve (a) which is connected to a pressure vessel (b). The valve (a) being a mechanical reseating type valve which is operable to allow the discharge of refrigerant from the vessel (b) to protect the vessel from over-pressurization, and recloseable to prevent further release of fluid from the vessel.

A common limitation associated with the prior art pressure relief systems is that the refrigerant must be evacuated from the pressure vessel and the refrigeration system prior to the repair and/or replacement of the pressure relief system. The evacuation of the refrigerant is an involved, time consuming, and costly procedure which requires shutting down the commercial or industrial operation while the refrigerant is removed from the refrigeration system. Typically the charge of CFC refrigerant in a system is in the range of about 50 to 2500 pounds, or more. Further, many commercial and industrial refrigeration systems are in constant demand with no schedule downtime, therefore, the necessity to evacuate the refrigerant from the system causes the commercial or industrial operation to be shut down with a corresponding loss of revenue.

Even with a variety of earlier designs of pressure relief systems for mechanical refrigeration systems, there remains a need for an improved pressure relief system. The present invention satisfies this need in a novel and unobvious way.

SUMMARY OF THE INVENTION

To address the unmet needs of pressure relief systems for mechanical refrigeration systems, one embodiment of the present invention contemplates an apparatus, comprising: a refrigeration system; a pressure vessel within the refrigeration system; and a pair of recloseable pressure relief valves in fluid communication with the vessel, wherein while one of the pressure relief valves is removed from the vessel the other of the pressure relief valves protects the pressurized vessel from over-pressurization.

Another form of the present invention contemplates a method for changing a pressure relief valve within a mechanical refrigeration system so as to minimize the discharge of refrigerant into the environment while providing vessel protection. The method comprises: providing a pair of pressure relief valves coupled to the vessel; uncoupling one of the pressure relief valves from the vessel; preventing the discharge of fluid from the vessel with the other of the pair of pressure relief valves after the uncoupling; and protecting the vessel from over-pressurization after the uncoupling with the other of the pair of pressure relief valves.

One object of one embodiment of the present invention is to provide an improved pressure relief system for a mechanical refrigeration system.

Related objects and advantages of the present invention will be apparent from the following description.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
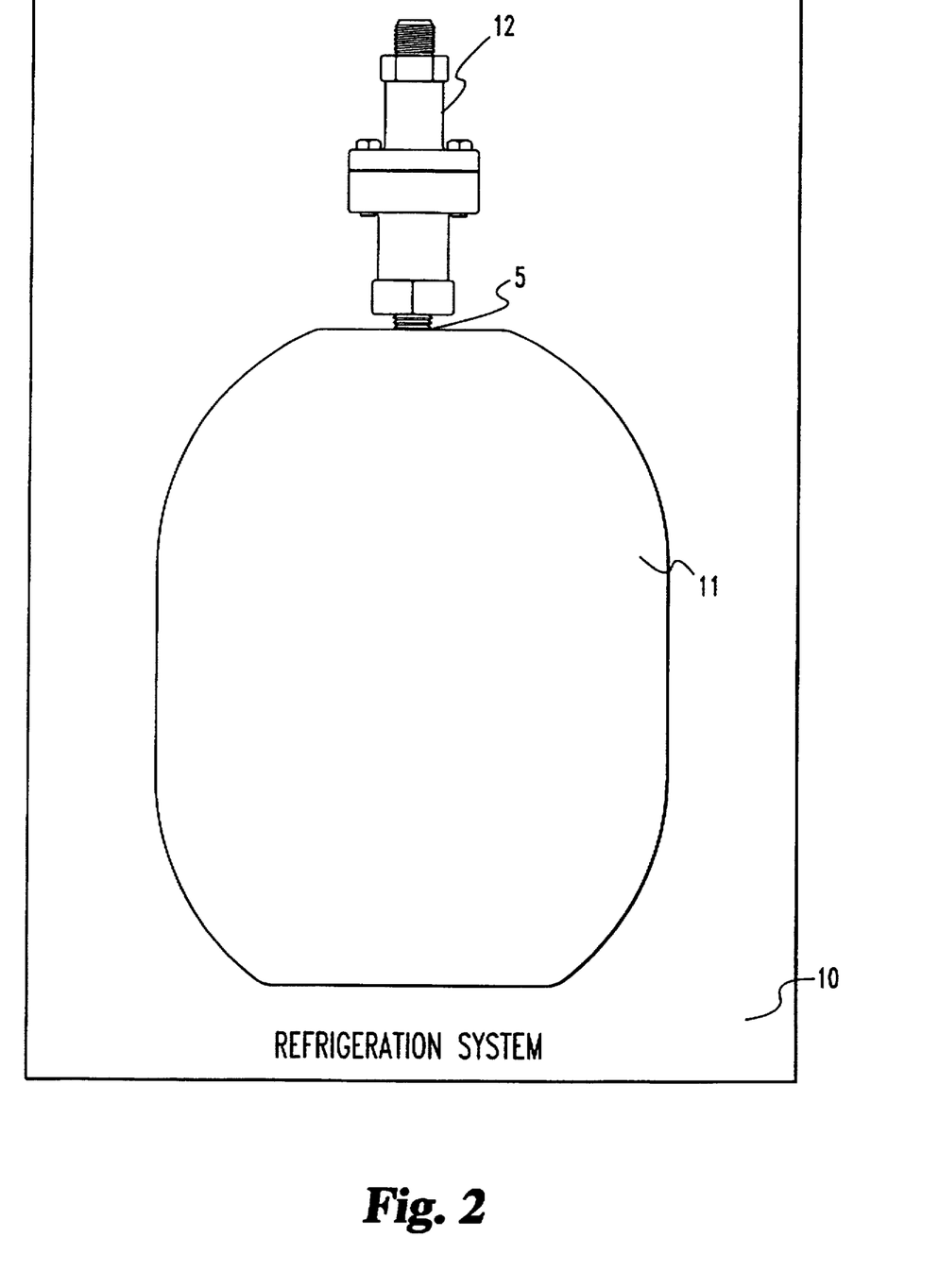
FIG. 2 is an illustrative view of a mechanical refrigeration system with a pressure relief system coupled thereto according to one embodiment of the present invention.

With reference to FIG. 2, there is illustrated a mechanical refrigeration system 10 having a pressure vessel 11 coupled thereto and/or within and which is protected from overpressurization by a pressure relief system 12. The vessel 11 having an aperture 5 therein for allowing fluid communication with the pressure relief system 12. The pressure vessel 11 comprises a portion of the closed loop refrigeration system that generally has three primary components through which a fluid flows. One of ordinary skill in the art understands that the three primary components include a compressor, a condenser, and an evaporator. The compressor is utilized to pressurize the fluid from a relatively low pressure gaseous state to a higher pressure gaseous state. It is understood that the fluid used in a refrigeration system is a refrigerant.

Upon exiting the compressor the relatively high pressure refrigerant gas flows into the condenser, which functions as a heat exchanger. The condenser removes energy from the vaporized refrigerant to facilitate the condensation of the relatively high pressure refrigerant vapor into a liquefied refrigerant which flows to the evaporator. The evaporator, being of a conventional design, functions to cool a heat exchange medium as the refrigerant is vaporized into a low pressure refrigerant gas, thereby absorbing energy from the heat exchange medium. The low pressure refrigerant gas is then drawn into the compressor to begin the refrigerant cycle again.

In order to comply with safety codes and to protect the equipment and associated personnel the pressure vessel 11 has coupled thereto the pressure relief system 12 that allows the selective venting of refrigerant gas from the vessel. The pressure relief system 12 functions to normally prevent the discharge of refrigerant from vessel 11 into the environment, however when the pressure within the vessel 11 exceeds a threshold pressure the reseatable pressure relief system 12 opens to allow refrigerant to be vented therefrom. The threshold pressure necessary to open the pressure relief system 12 is dependent upon many parameters and the selection of a pressure relief system that will open at the desired pressure is within the capability of those of ordinary skill in the art. In one more preferred embodiment pressure relief system 12 is designed to open at about 235 pounds per square inch gauge. Further, it is preferred that the pressure relief system 12 be designed to open in a range of about 200-450 pounds per square inch gauge. The above pressure values for opening the pressure relief system are not meant to be limiting, and it is understood that pressure relief systems opening at other values are contemplated herein.

Figure 3:
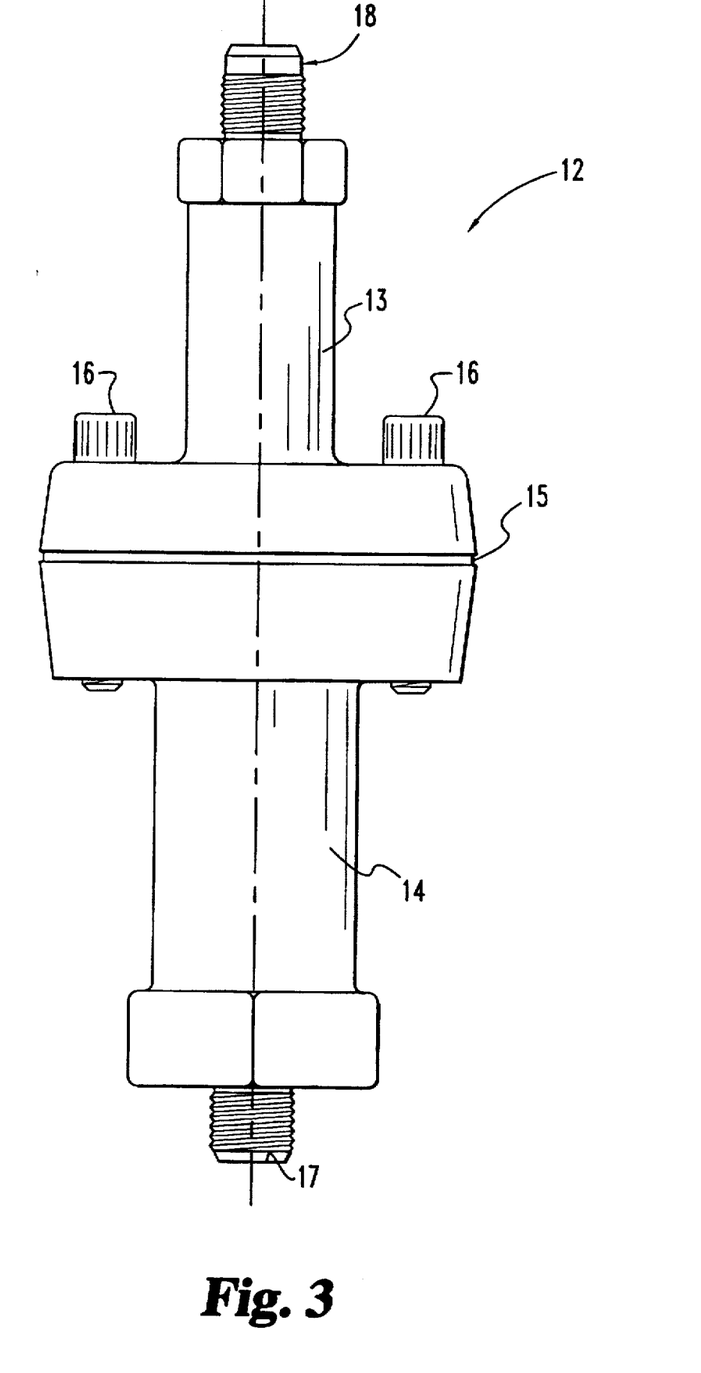
FIG. 3 is an enlarged side elevational view of the FIG. 2 pressure relief system.

Referring to FIG. 3, there is illustrated an enlarged side elevational view of the pressure relief system 12. The pressure relief system 12 includes a primary pressure relief unit 13 having a primary pressure relief valve therein, and a secondary pressure relief unit 14 having a secondary pressure relief valve therein that are in fluid communication with pressurized vessel 11 through opening 5. It is understood that the pressurized vessel is pressurized above atmospheric pressure. A sealing gasket 15 is positioned and compressible between the primary pressure relief unit 13 and the secondary pressure relief unit 14 to provide a fluid tight seal. A pair of fasteners 16 couple together the primary pressure relief unit 13 and the secondary pressure relief unit 14. In the preferred embodiment the fasteners are cap screws. An externally threaded connector 17 extends from the secondary pressure relief unit 14 for coupling the system 12 to the pressure vessel 11 of the refrigeration system 10. A threaded vent tube connector 18 extends from the primary pressure relief unit 13 for connection to a vent tube (not illustrated). It is clearly understood that other methods of connecting the pressure relief valve system 12 to supporting structure, such as soldering and sweating are contemplated herein.

Figure 4:
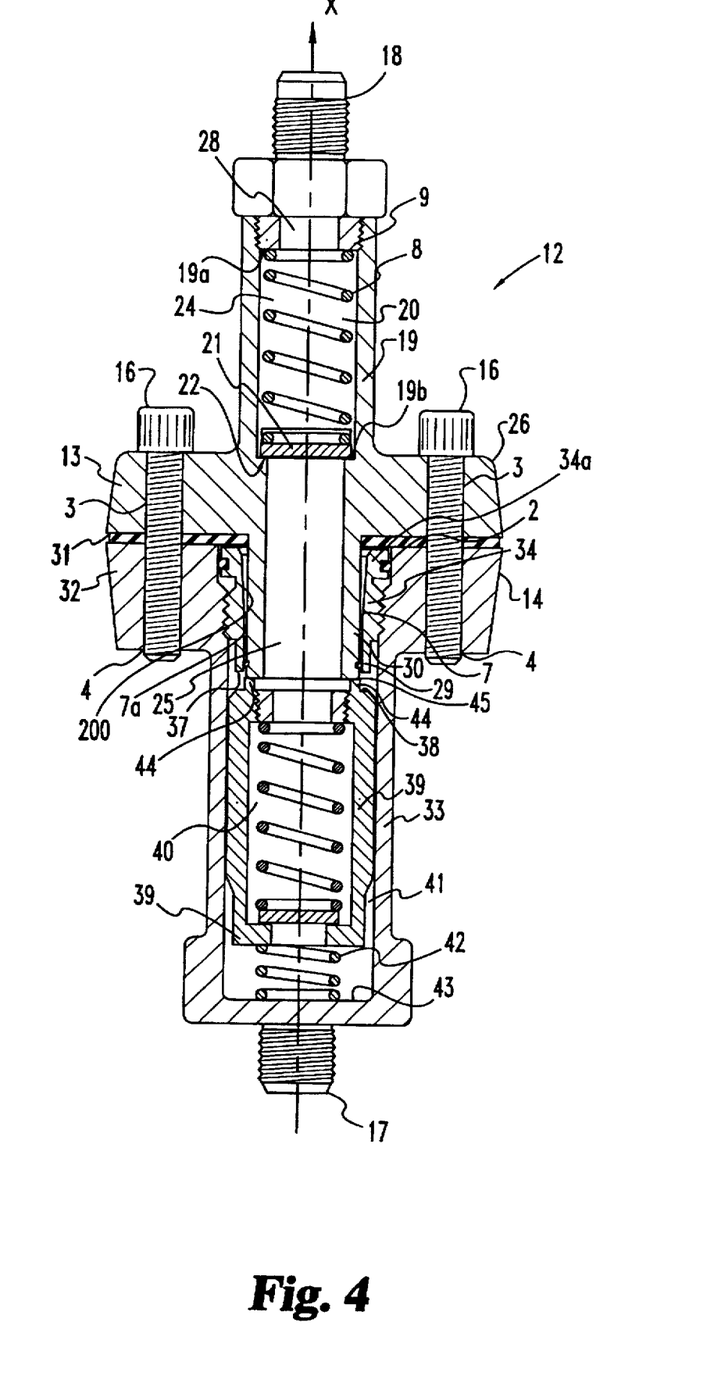
FIG. 4 is a side elevational view in full section of the FIG. 2 pressure relief system.

With reference to FIG. 4, there is illustrated a side elevational view in full section of the mechanical pressure relief system 12. The primary pressure relief unit 13 having a primary unit body 19 with a mechanical pressure relief valve 20 disposed therein for providing primary pressure protection of the vessel 11. Preferably, the unit body 19 is integrally cast and includes a mating flange 26 extending from the valve body. The flange having two spaced apertures 3 passing therethrough for the receipt of fasteners 16. It is preferred that body 19 be formed of a material that is substantially resistant to corrosion, such as brass or stainless steel. Other materials having the necessary properties are contemplated herein.

In the preferred embodiment the primary pressure relief valve 20 being a direct straight through type relief valve. A removeable spring 8, that is kept in place by a removable spring retainer 9, is positioned between an upper portion 19a of the primary unit body 19 and a lower portion 19b of the unit body. A reseatable seat disk 21 is positioned on, and is normally spring biased against valve seat 22 by spring 8 to normally prevent the flow of fluid from the vessel 11. In the preferred embodiment reseatable seat disk 21 is formed of an elastomeric material, and one preferred material is Neoprene. It is understood that other types of reseatable pressure relief valves are contemplated herein provided that they provide a bubble tight seat.

The primary pressure relief valve 20 being positioned in a passageway 24 that is coaxial with a second passageway 25 extending through the primary unit body 19. A fluid exit aperture 28 is positioned coaxial with passageways 24 and 25.

In a preferred embodiment a secondary valve actuator 30 is integrally cast with the primary unit body 19 and extends parallel to the centerline X. The secondary actuator 30 being substantially cylindrical and extending from a lower surface 31 of the primary unit body 19 and being sized such that it is insertable into the secondary pressure relief unit 14. A seal 29 is positioned circumferentially around the secondary actuator 30 to form a transitional fluid seal with a portion of the secondary pressure relief unit 14. In the preferred embodiment the seal 29 is an O-ring. The secondary pressure relief unit 14 having a secondary unit body 33 that is preferably integrally cast of a material as disclosed for unit body 19. Secondary unit body 33 having a flange 32 extending therefrom which corresponds with flange 26 of the primary unit body 19. Flange 32 including a pair of spaced threaded apertures 4 for receiving the fasteners 16 therein.

A transitional member 34 is coupled to the secondary unit body 33. The transitional member 34 having a passageway therethrough which is sized to receive the secondary valve actuator 30 therein and a substantially fluid tight seal is formed between seal 29 and the substantially cylindrical portion 7 of the transition member 34. The transitional member 34 having a first end 34a that is enlarged to provide an enlarged tapered surface 200 that transitions to the substantially cylindrical surface 7a of the cylindrical portion 7. In the preferred embodiment the enlarged tapered surface 200 defines a right circular cone. The surface 200 provides a leadin for easier entry of the secondary valve actuator 30 into the secondary unit body 33.

Seal 29 when passed into the transitional member 34 forms a substantially fluid tight seal when disposed adjacent the substantially cylindrical surface 7a. While the seal 29 is adjacent the surface 200 there is not formed a substantially fluid tight seal. The substantially non-sealing arrangement between surface 200 and seal 29 provides a safety feature in that upon removal of the primary unit body 19, any pressurized fluid that may act on the primary unit body 19 bypasses through this enlarged frusto-conical cavity at end 34a. Further, the sound of any escaping gas in the area is a warning signal to a technician servicing the system 12. Cap screws 16 are of sufficient axial length to allow the seal 29 to be positioned in the first end 34a of transitional member 34 before the primary and secondary pressure relief units 13 and 14 are uncoupled, thereby providing an added safety feature to the service technician. In the preferred embodiment the transitional member 34 is threaded into the secondary unit body 33. In one embodiment a seal 2 provides for a substantially fluid tight joint between the transitional member 34 and the secondary unit body 33. In alternate embodiments of the present invention the transitional member 34 is connected to the secondary unit body 33 by other affixation methods known to those of ordinary skill in the art.

In the preferred embodiment transitional member 34 having an annular valve seat surface 37 which is contactable with an outer annular portion 38 of a secondary pressure relief valve body 39. The secondary pressure relief valve 40 being moveable within a passageway 41 formed within the secondary unit body 33. The secondary pressure relief valve 40 being moveable upon the removal of primary pressure relief unit 14 such that the annular portion 38 of valve body 39 engages and forms a substantially fluid tight seal with the annular valve seat surface 37. In the preferred embodiment the primary pressure relief valve 20 and the secondary pressure relief valve 40 being in series with one another.

Secondary pressure relief valve 40 being normally spring biased by a spring 42 from surface 43 of the secondary unit body 33. In the preferred embodiment a pair of upstanding spaced partial annular rings 44 extend axially from the secondary pressure relief valve body 39. The pair of partial annular rings 44 being contactable by the lower annular surface 45 of the secondary valve actuator 30 when the primary pressure relief unit 13 is in place. With the primary pressure relief unit 13 coupled to the secondary pressure relief unit 14 the seating surface 37 and the annular portion 38 of the secondary pressure relief valve are not disposed in a sealing relationship. Therefore, fluid from pressure vessel 11 can flow around the secondary pressure relief valve 40, through aperture 25, and bear against the reseatable disk 21 of the primary pressure relief valve 20. Upon the pressure acting upon the reseatable seat disk exceeding a predetermined pressure the primary pressure relief valve 20 opens to allow the release of fluid and reduce the pressure within vessel 11. While the primary pressure relief unit 13 is coupled to the secondary pressure relief unit 14, the secondary pressure relief valve 40 is rendered inoperable for controlling the discharge of fluid from the pressure vessel 11.

Figure 5:
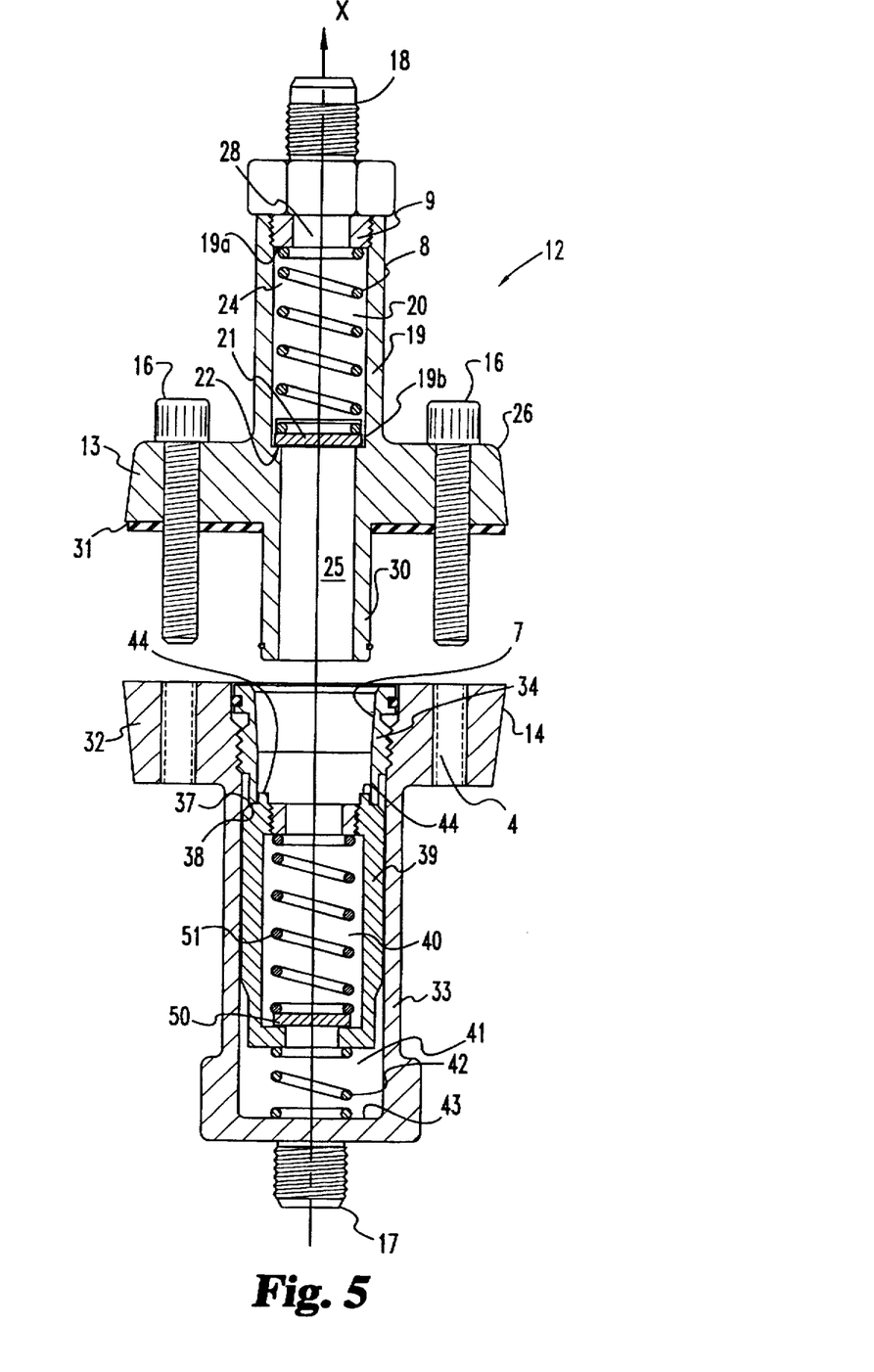
FIG. 5 is a side elevational view in full section of the mechanical pressure relief system of FIG. 2 with a primary pressure relief unit comprising a portion of the mechanical pressure relief system uncoupled therefrom.

With reference to FIG. 5, there is illustrated pressure relief system 12 with the primary pressure relief unit 13 uncoupled from the secondary pressure relief unit 14. Removal of the primary pressure relief unit 13 from the secondary pressure relief unit 14 is generally accomplished by loosening and removing the pair of fasteners 16 from the threaded apertures 4 of secondary unit flange 32. Upon the uncoupling and removal of the primary pressure unit 13 from the mechanical pressure relief system 12, the secondary pressure relief valve 40 is biased by spring 42 away from surface 43 so that annular valve seat surface 37 and the outer annular portion 38 of secondary valve body 39 are brought into a substantially fluid tight arrangement. With the primary pressure relief unit 13 removed from the mechanical pressure relief system 12 the secondary pressure relief valve 40 normally prevents the discharge of fluid into the environment and provides vessel over-pressurization protection.

While the primary pressure relief unit 13 is removed from the pressure relief system 12 the pressurized fluid now acts against a reseatable seat disk 50 positioned within the secondary pressure relief valve 40. The secondary pressure relief valve 40 is a direct acting straight through type pressure relief valve substantially like primary pressure relief valve 20 utilized in the primary pressure relief unit 13. A spring 51 provides a normal force to keep the secondary pressure relief valve 40 closed until the fluid pressure acting on disk 50 exceeds the spring force. Upon the fluid pressure acting on disk 50 exceeding the spring force of spring 51 the fluid forces open the secondary pressure relief valve 40 to discharge fluid.

Figure 6:
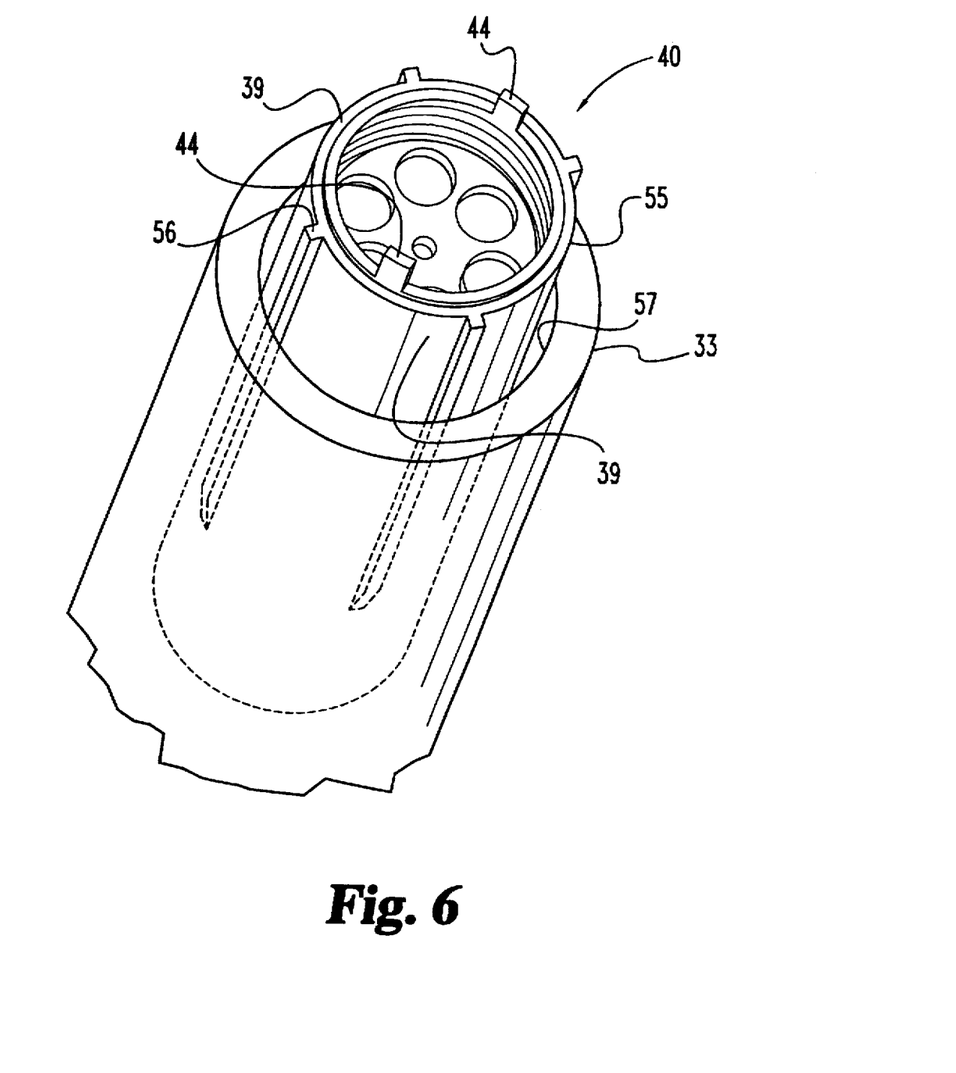
FIG. 6 is a perspective view of a secondary pressure relief valve comprising a portion of the FIG. 2 mechanical pressure relief system.

With reference to FIG. 6, there is illustrated a perspective view of the secondary pressure relief valve 40 extending from the secondary unit body 33 with flange 32 removed. In the preferred embodiment secondary pressure relief valve body 39 includes a substantially cylindrical outer wall member 55 having a plurality of ribs 56 which extend along a substantial portion of the body's axial length. The plurality of ribs 56 function to space the substantially cylindrical wall member 55 from the substantially cylindrical surface 57 formed in the secondary unit body 33. In the preferred embodiment the plurality of ribs 56 being located 90° apart. Further, the plurality of ribs 56 forming forming fluid flow paths between the inner cylindrical surface 57 and the body 39 of the pressure relief valve 40.

Having described one embodiment of the pressure relief system 12 an example of its operation will now be described with the assistance of FIGS. 2–5. The pressure relief system 12 is connected to vessel 11 by engaging the connector 17 into a correspondingly threaded aperture within the vessel. With the pressure relief system 12 coupled to the vessel 11 the release of pressurized fluid from the vessel is normally eliminated and over-pressurization protection is provided by the primary pressure relief unit 13.

Removal of the primary pressure relief unit 13 from a pressurized vessel 11 is accomplished by loosening the pair of fasteners 16 from the flange of the secondary pressure relief unit 14. Upon removal of the fasteners 16 the spring 42 biases the second pressure relief valve 40 axially against the transitional member 34 to form a fluid tight seal between annular portion 38 and annular sealing surface 37. The secondary pressure relief valve 40 now preventing the normal discharge of fluid from the vessel 11 and providing over-pressure protection. The installation of the primary pressure relief unit 13 involves inserting the secondary valve actuator 30 within the transitional member 34. The connection and tightening of the cap screws 16 draw the primary and secondary unit together. As the primary unit is connected to the secondary unit the valve actuator 30 renders the secondary pressure relief valve 40 inoperable for controlling the release of fluid from the vessel 11. Secondary pressure relief valve 40 becomes biased away from sealing surface 37.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An apparatus, comprising:

a refrigeration system;

a pressure vessel within said refrigeration system;

a first pressure relief valve coupled to and in fluid communication with said pressure vessel for protecting the vessel from an over-pressure condition; and a second pressure relief valve in series with said first pressure relief valve, said second pressure relief valve having a first mode not for controlling the fluid flow from said vessel, and a second mode for controlling the fluid flow from said vessel; and said first pressure relief valve being coupled to said vessel and said second valve being in said first mode, and said second valve being in said second mode upon said first pressure relief valve being uncoupled from said vessel.

2. The apparatus of claim 1, which further includes a first pressure relief valve unit and a second pressure relief valve unit, said first pressure relief valve unit having said first pressure relief valve positioned therein and said second pressure relief valve unit having said second pressure relief valve positioned therein, and wherein said first pressure relief valve unit is coupled to said second pressure relief valve unit.

3. The apparatus of claim 2, wherein said second pressure relief valve is slidable within said second pressure relief valve unit.

4. The apparatus of claim 3, wherein said first pressure relief valve unit includes an actuator for moving said second pressure relief valve within said second pressure relief valve unit between said second mode and said first mode.

5. The apparatus of claim 4, wherein said actuator having a seal disposed thereround, and wherein said second pressure relief valve unit having a transitional portion that includes a first enlarged passageway to form a substantially non-sealing arrangement with said seal and a second passageway for forming a substantially fluid tight seal with said seal.

6. The apparatus of claim 5, wherein said seal is an elastomeric ring.

7. The apparatus of claim 3, wherein said second pressure relief valve includes an annular sealing surface, and wherein said second pressure relief valve unit includes a corresponding annular sealing surface, and wherein said annular sealing surfaces are disposed in abutting sealing contact during said second mode so as to prevent fluid from said vessel from bypassing said pressure relief valve.

8. The apparatus of claim 7, which further includes a spring positioned between said second pressure relief valve unit and said second pressure relief valve, said spring biasing said annular sealing surface on said second pressure relief valve against said annular sealing surface on said second pressure relief valve unit during said second mode.

9. The apparatus of claim 8, wherein said first pressure relief valve unit includes an actuator for moving said second pressure relief valve within said second pressure relief unit between said second mode and said first mode.

10. The apparatus of claim 9, which further includes a fluid passageway between the outer surface of said second pressure relief valve and said second pressure relief valve unit.

11. The apparatus of claim 10, wherein said second pressure relief valve includes at least one rib extending therefrom.

12. The apparatus of claim 1:

which further includes a first pressure relief valve unit and a second pressure relief valve unit, said first pressure relief valve unit having said first pressure relief valve positioned therein and said second pressure relief valve unit having said second pressure relief valve positioned therein, wherein said first pressure relief valve unit is coupled to said second pressure relief valve unit;

wherein said second pressure relief valve unit having an aperture therein, and wherein said second pressure relief valve slidable within said aperture;

wherein said first pressure relief valve unit includes an actuator for moving said second pressure relief valve within said aperture so as to switch from said second mode to said first mode;

wherein said second pressure relief valve includes an annular sealing surface formed thereon, and wherein said second pressure relief valve unit includes a corresponding annular sealing surface, and wherein said annular sealing surfaces are disposed in abutting sealing contact during said second mode so as to prevent the fluid from said vessel from bypassing said second pressure relief valve; and which further includes a spring positioned within said aperture between said second pressure relief unit and said second pressure relief valve, said spring biasing said annular sealing surface on said second pressure relief valve against said annular sealing surface on said second pressure relief unit during said second mode.

13. The apparatus of claim 1, wherein said first pressure relief valve provides primary over-pressure protection for said pressure vessel, and wherein said first pressure relief valve having a bubble tight seat.

14. The apparatus of claim 13, wherein said first pressure relief valve is a direct straight through type relief valve.

15. The apparatus of claim 14, which further includes a safety for allowing the fluid to bypass said first pressure relief unit during the uncoupling of said first pressure relief valve from said vessel.

16. The apparatus of claim 1, wherein at least one of said pair of pressure relief valves open in the range of about 200–450 pounds per square inch gage.

17. An apparatus, comprising:

a refrigeration system;

a pressure vessel associated with said refrigeration system;

a passageway connected to said vessel and in fluid communication therewith;

a reseatable primary pressure relief valve coupled to said passageway for normally protecting the vessel from over-pressurization;

a reseatable secondary pressure relief valve coupled to said passageway and normally in fluid communication with said primary relief valve; and wherein said secondary pressure relief valve being inoperable for controlling fluid flow from said passageway while said primary pressure relief valve is coupled to said passageway, and said secondary valve being operable for controlling fluid flow from said passageway while said primary pressure relief valve is uncoupled from said passageway.

18. The apparatus of claim 17, wherein said pressure relief valves each have a bubble tight seal.

19. The apparatus of claim 17, which further includes a primary pressure relief valve unit and a secondary pressure relief valve unit, said primary pressure relief valve unit having said primary pressure relief valve positioned therein and said secondary pressure relief valve unit having said secondary pressure relief valve therein, and wherein said primary pressure relief valve unit is removeably coupled to said secondary pressure relief valve unit.

20. The apparatus of claim 19, wherein said secondary pressure relief valve unit having a central aperture therethrough, and wherein said secondary pressure relief valve being slidable within said aperture.

21. The apparatus of claim 20, wherein said primary pressure relief valve unit includes a member for engaging a portion of said secondary pressure relief valve so as to move said secondary pressure relief valve within said aperture, whereby upon moving said secondary pressure relief valve within said aperture said secondary pressure relief valve changing between operable and inoperable for controlling fluid flow from said passageway.

22. The apparatus of claim 20, wherein said primary pressure relief valve unit includes an actuator having a seal disposed thereround, and wherein said secondary pressure relief valve unit having a transitional portion that includes a first enlarged passageway to form a substantially nonsealing arrangement with said seal and a second passageway for forming a substantially fluid tight seal when said seal is disposed thereagainst.

23. The apparatus of claim 22, wherein said secondary pressure relief valve includes an annular seal, and wherein said secondary pressure relief valve unit includes a corresponding annular seal, and wherein said annular seals are placed in contacting sealing contact when said secondary pressure relief vale is operable for controlling fluid flow from said passageway.

24. The apparatus of claim 23, wherein at least one of said pair of pressure relief valves open in the range of about 200–450 pounds per square inch gage.

25. An apparatus, comprising:
- a refrigeration system;
- a pressure vessel within said refrigeration system;
- a reseatable primary pressure relief valve having a primary body member, said primary pressure relief valve positioned within said primary body member, and said primary pressure relief valve coupled ho said vessel to normally provide over-pressure protection for said vessel;
- reseatable secondary pressure relief means for controlling the discharge of fluid from said vessel upon said primary pressure relief valve being uncoupled from said vessel, further said secondary pressure relief means being operable to open and discharge fluid from said vessel upon an over-pressurization therein, said primary pressure relief valve and said secondary pressure relief means are positioned in series; and
- wherein said primary body member includes actuator means for engaging said secondary pressure relief means.

26. The apparatus of claim 25, wherein said primary pressure relief valve and said secondary pressure relief means opens in a range of about 200–450 pounds per square inch gage.

\* \* \* \* \*